United States Patent Office.

WILLIAM P. VAN DEURSEN, OF CINCINNATI, OHIO, ASSIGNOR TO HIMSELF AND WILLIAM C. DAVIS, OF SAME PLACE.

*Letters Patent No. 103,800, dated May 31, 1870.*

IMPROVED COMPOSITION FOR EXTINGUISHING FIRES.

The Schedule referred to in these Letters Patent and making part of the same.

I, WILLIAM P. VAN DEURSEN, of Cincinnati, Hamilton county, Ohio, have invented a new and useful Means of Extinguishing Fires, of which the following is a specification.

General Description.

Having provided an air-tight tank or vessel such as forms part of an ordinary "fire-annihilator," I add to each pound of the carbonate of soda or other customary chemical from two to ten gallons of glycerine, more or less, according to the nature of the fire to be extinguished, fires abounding in flame requiring least, and those having a large proportion of incandescent solids requiring the most glycerine.

The tank is also provided with a faucet or nozzle, a customary sealed receptacle of sulphuric acid, and a hermetical cover.

Operation.

Having discharged the sulphuric acid among the other contents of the tank by customary or any suitable means, and having directed the nozzle of the tank onto the fire, I open the nozzle so as to discharge the contents, causing the combined gas and glycerine to spread in a foam-like covering over the fire, so as, by excluding air, to terminate combustion, the gas chiefly attacking the flame, and the gas and glycerine combined the solid constituents of the fire.

The glycerine, being capable, when under pressure, of absorbing many times its own volume of carbonic-acid gas, and by its viscidity and resistance to evaporation of retaining the same in its interstices, even after contact with the fire, enables it to hold the gas in intimate contact with the burning matters, while its exemption from freezing, even at very low temperatures, insures its effective condition at any moment in the depth of winter, and relieves the apparatus from any danger of being burst by the formation of ice within it.

While selecting for illustration the preferred form of my invention, I reserve the right to vary the operation in non-essential particulars; for example, I may avoid the necessity of any carbonated earth or alkali, and also of any sulphuric acid within the tank, by pumping in or injecting carbonic-acid gas until the requisite absorption and pressure have been attained, and I may use water in greater or less amount with the glycerine.

While preferring carbonic-acid gas in this connection, I may use, either in conjunction with such gas or separately, one or more other of the inert gases.

Claim.

I claim as my invention—

The use or employment, for extinguishing fires, of glycerine, either with or without water, in combination with carbonic-acid gas, or its equivalent, under pressure, substantially as set forth.

In testimony of which invention I hereunto set my hand.

WM. P. VAN DEURSEN.

Witnesses:
G. H. KNIGHT,
JAMES H. LAYMAN.